W. SHUEY.
EGG SEPARATOR.
APPLICATION FILED JAN. 16, 1911.
1,001,314.
Patented Aug. 22, 1911.
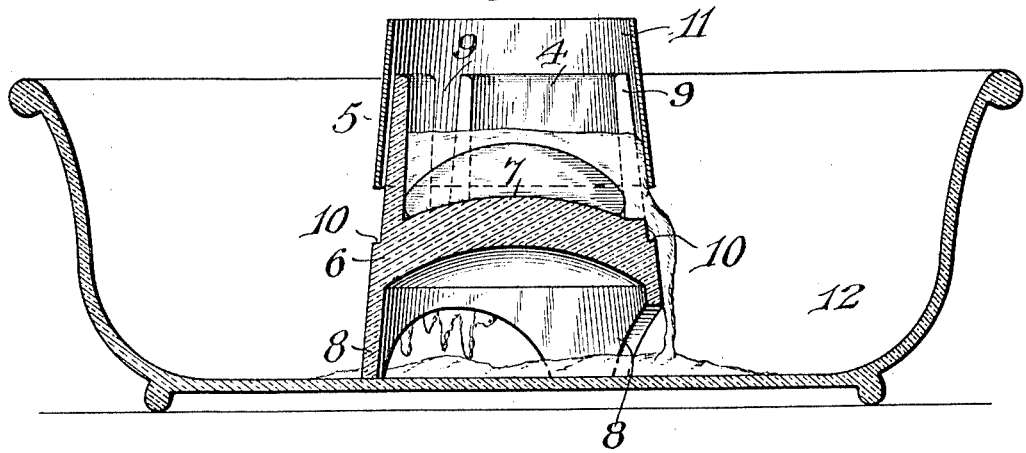
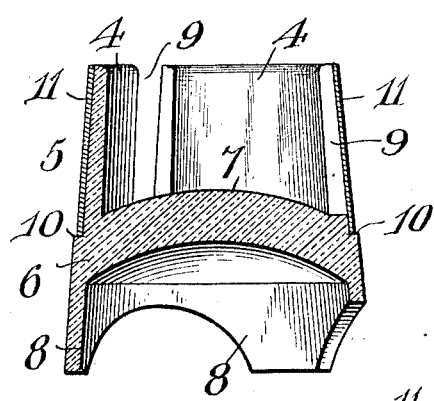
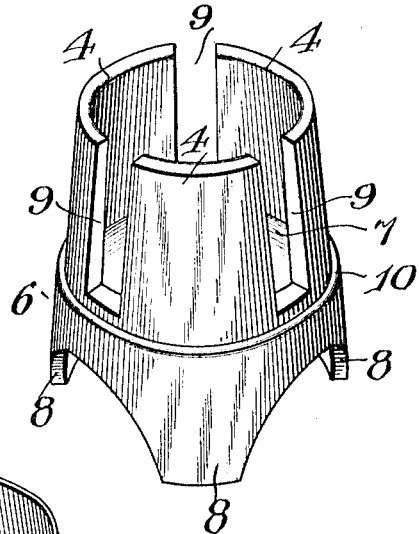
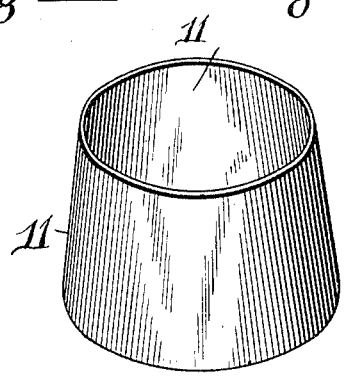
William Shuey,
INVENTOR
WITNESSES

UNITED STATES PATENT OFFICE.

WILLIAM SHUEY, OF WELLSBURG, WEST VIRGINIA.

EGG-SEPARATOR.

1,001,314.   Specification of Letters Patent.   Patented Aug. 22, 1911.

Application filed January 16, 1911. Serial No. 602,975.

*To all whom it may concern:*

Be it known that I, WILLIAM SHUEY, a citizen of the United States, residing at Wellsburg, in the county of Brooke and State of West Virginia, have invented a new and useful Egg-Separator, of which the following is a specification.

My invention relates to improvements in egg separators, and particularly to that class of separators in the form of a cup or receptacle adapted to receive the egg in its entirety after being removed from the shell and within which the white will be caused to separate itself from the yolk.

The principal object of the invention is to provide a separator in the form of a receptacle having a convex bottom having openings in the wall of the receptacle, and a closure for the said openings, the receptacle being adapted to receive the egg, and after the quality thereof is determined, the same may be easily separated, the yolk remaining in the separator and the white passing out of the openings in said separator to a suitable receptacle.

Another object is to provide a separator of the above mentioned type, composed of few parts, which may be easily separated and thoroughly cleansed or sterilized when the operation of separating eggs has been completed.

With these and other objects in view, the invention consists in the construction and novel combination of parts hereinafter fully described, illustrated in the accompanying drawing, and pointed out in the claims; it being understood that various changes in the form, proportion, size and minor details of construction, within the scope of the claims appended, may be resorted to without departing from the spirit or sacrificing any advantages of the invention.

In the drawings wherein similar reference numerals indicate corresponding parts throughout the several views, Figure 1 is a vertical central section of my invention, showing it in a bowl with the cut-off ring and closure elevated and in the act of separating the white from the yolk of an egg. Fig. 2 is a vertical section of the separator with the cut-off ring in its lowermost position. Fig. 3 is a perspective view of the separator showing the slots through which the white of the egg passes, and Fig. 4 is a perspective view of the cut-off ring.

Referring to the drawings, 5 designates my improved separator comprising a hollow conical cup or receptacle 6, of a size large enough to accommodate an egg, and provided with a convex bottom 7 and supported on suitable legs 8, the whole being constructed of any suitable material, such as glass, china or the like and preferably cast or molded in one piece. It is preferred that the diameter of the receptacle shall be equal to the yolk of the egg.

The wall of the receptacle is provided with one or more vertical slots or openings 9, extending from the top of said receptacle to a point where the said wall and convex bottom join, thus dividing said wall into a series of parts 4 which are arcuate in form.

Extending around the outer side of the receptacle 6, at a point below the slots or openings 9, is an annular offset shoulder 10, which provides a seat for a conical band or cut-off ring 11, which is of the same configuration as, but slightly larger in diameter than the outer side of the parts 4 of the receptacle, and when in position is adapted to slide over and fit closely around the said parts, thereby providing a closure for the said slots or openings 9. The band or ring 11 is preferably constructed of sheet metal and is of a height equal to the distance between the shoulder 10 and the top of the receptacle.

In practice when it is desired to separate an egg, the separator is assembled as in Fig. 2, the cut-off ring resting on the shoulder 10. The egg after being separated from its shell is deposited in the receptacle. The ring is now raised from its seat, as in Fig. 1, allowing the albumen to pass through the openings 9, under said ring and into a dish or bowl 12; (Fig. 1); it being directed to the sides of the separator by the convex upper face of the bottom 7. The yolk will be retained within the separator, and the lighter particles thereof which may adhere thereto will be separated from the albumen when the lower sharp edge of the cut-off ring contacts with the shoulder 10. The cut-off ring may be raised and lowered several times thereby insuring a complete separation of the albumen from the yolk. The thickness of the parts 4 prevents the yolk from contacting with the cut-off ring and being broken thereby.

Having thus described my invention, what

I claim as new, and desire to secure by Letters-Patent, is:—

1. A device for separating the whites from the yolks of eggs, comprising a receptacle adapted to retain an egg, openings in the side of said receptacle for the passage therethrough of the white of an egg, and a cut-off ring adapted to encircle said receptacle and close said openings.

2. A device for separating the whites from the yolks of eggs, comprising a receptacle having a convex bottom, the sides of said receptacle being provided with vertical slots through which the white of an egg is adapted to pass, said slots extending from the top of the receptacle to a point level with said convex bottom, and a cut-off ring adapted to encircle said receptacle and close said openings.

3. A device for separating the whites from the yolks of eggs, comprising a one-piece conical receptacle, having legs and a convex bottom, the sides of said receptacle being provided with vertical slots extending from the top of said receptacle to the point of junction of said sides and bottom, an offset shoulder located below said slots and extending around the outside of said receptacle, and a conical cut-off ring adapted to slide over and closely encircle the outside of said receptacle and close said openings, said ring being of a height sufficient to extend from said shoulder to the top of said receptacle when in its lowermost position.

In testimony, that I claim the foregoing as my own, I have hereto affixed my signature in the presence of two witnesses.

WILLIAM SHUEY.

Witnesses:
JOHN S. SCOTT,
C. B. MAGEE.

Copies of this patent may be obtained for five cents each, by addressing the "Commissioner of Patents, Washington, D. C."